Patented Nov. 13, 1945

2,388,891

UNITED STATES PATENT OFFICE 2,388,891

TREATING CARCASSES

Beverly E. Williams and Leon L. Cadwell, Chicago, Ill., assignors to Industrial Patents Corporation, Chicago, Ill., a corporation of Delaware No Drawing. Application August 19, 1943, Serial No. 499,250

5 Claims. (Cl. 99—107)

This invention relates to the treatment of animal carcasses and more particularly to the method of improving the color of skinned carcasses of beef, lamb and veal.

The color on the surface and in the interior of carcasses ordinarily ranges from a light cherry red to a purple, depending upon the age of the animal, the method of feeding and the manner of handling. The carcass from an old animal produces meat having the color in the darker range whereas the carcass from a younger animal, such as calves, produces meat having a color in the lighter range. Dry corn feeding generally tends to produce a carcass having a light color and green feeding tends to produce a carcass having an undesirable dark color. The carcass having the best color, therefore, is ordinarily produced from dry corn fed mature animals and from younger animals such as calves. Also the customary method of preparing animal carcasses is to skin the carcass on the killing floor and then transfer the skinned carcass to a cooler maintained at a temperature of about 30° F. to 35° F. In the cooler, the surface of the carcass tends to become discolored due to dehydration and oxidation.

Although light color has become associated with a good quality of meat, color is not a criterion of the eating quality of meat because some of the best flavored meats are derived from carcasses having a relatively dark color. For example, the flavor of mature heavy beef is much superior to the flavor of a very light color meat derived from immature animals such as calves. The moisture content is generally a good indication of the quality of the meat. A good grade of meat is usually juicy and is high in moisture content. The poorer grades of meat ordinarily are relatively dry. The moisture content here referred to is more perceptible by feel and to sight than actual analysis.

An object of the present invention is to improve the color of carcass meat.

Another object of the invention is to improve the moistness or juiciness of meat.

A further object of the invention is to treat carcass meat to produce a lighter color on the surface of the meat and to produce cuts of improved color on the cut surface.

We have found that the color and moistness of carcass meat may be substantially improved if the freshly skinned carcass is subjected to an atmosphere of relatively high humidity and temperature for a sufficient length of time. The humidity is preferably about one hundred per cent which may be obtained by the introduction of steam to the surrounding atmosphere. The atmospheric temperature should be at least about 110° F. and may be as high as possible without causing appreciable cooking of the meat. We prefer to use atmospheric temperatures of about 110° F. to about 118° F. although temperatures as high as about 120° F. to 122° F. may be used. The time depends upon the type of meat treated and is generally regulated so that for a given atmospheric temperature the meat will reach the optimum maximum temperature. We have found that the optimum maximum meat temperatures for beef and veal is about 101° F to 105° F., and preferably about 102.5° F. The optimum maximum temperature for lamb and sheep is about 105° F. to 112° F. and preferably about 110° F. We have found that by treating meat in a high humidity chamber maintained at a temperature of about 118° F. that the above stated maximum optimum temperature will be reached in about three-quarters to one and one-half hours, depending upon the carcass weight. The temperature of the meat is measured in the center eye of the rib.

In practicing the invention, the carcass is preferably skinned on the killing floor at which time it has a temperature of about 98.6° F. to 100° F. although it may run to about 105° F. in some cases. In cases where the latter temperatures are encountered the animal has usually developed a fever prior to killing. The carcass is transferred to a treating chamber wherein it is subjected to a substantially saturated atmosphere and a temperature of about 110° F. to 118° F. The carcass is maintained in the treating chamber for about one hour to three and one-half hours until it has reached the maximum optimum temperature for the weight, size and kind of carcass to be treated. The carcass is then transferred to a regular chilling room or cooler wherein it is chilled to a temperature just above freezing.

We have found it advantageous to cover the carcass on the killing floor with a brine moistened cloth and maintain the cloth on the carcass during the treatment in the high humidity chamber. The cloth effectively protects the surface of the meat from direct contact with the steam and also absorbs material exuding from the surface. The cloth is preferably removed and replaced by a clean cloth at the time of transferring the carcass to the chilling room. Instead of cloth, we may use any equivalent covering material such as parchment paper.

As an example of the operation of the invention, a steer was killed and skinned on the killing floor and the carcass divided into two sides. After the customary washing and handling, the sides were completely covered with a brine moistened cloth and then immediately transferred to a treating chamber wherein the temperature was maintained in the chamber at 118° F., using a relative humidity of approximately one hundred per cent. The clothed sides were maintained in the treating room until the temperature at the center of the eye of the longissimus dorsi muscle of the rib between the first and second ribs reached 102.5° F. The elapsed time was one and one-quarter hours from the time the sides entered the treating room until the eye of the rib reached the above mentioned temperature. The sides were then removed from the treating room, the cloth removed, the sides washed and wiped free of any exuded or removable gelatinous material. They were again clothed in a brine moistened cloth and transferred to a coler with a temperature of approximately 32° F. to 34° F. where they were allowed to chill for forty-eight hours before being ribbed into quarters. The carcass of the beef at the rib line was noticeably lighter and improved to a bright cherry red. The entire beef was subsequently broken up into primal cuts, all of the cut surfaces of which revealed the bright cherry red improved color and moist surface characteristics. Several of the primal cuts were later cut up into steaks and roasts and these also had all of the above mentioned desirable characteristics. The ribs and loins were aged on aging racks and were examined by making fresh cuts therefrom at intervals of one week up to six weeks. The new exposed surface of each weekly cutting revealed the same primal color and moist characteristics as when the carcass was first ribbed at forty-eight hours after killing.

A similar beef carcass was handled in the conventional manner by immediately transferring the skinned and washed carcass from the killing floor to the cooler without the heat and humidity treatment of the present invention. After chilling for forty-eight hours and ribbing into quarters, the meat exhibited a considerably darker and drier texture which was true throughout all of the cuts of the beef. When the ribs and loins of this beef were aged for like periods of one to six weeks and examined periodically, they exhibited the same dark purplish red, dry texture of ordinary beef.

As an example of the operation of the invention as applied to lambs, a lamb was killed and dressed on the killing floor in the usual manner, but was then completely covered with a protective covering such as a brine moistened cloth arranged in intimate contact with the meat. The clothed carcass was then transferred to the heat treating room where the atmospheric temperature was about 118° F. and the relative humidity about 100 percent. The lamb was maintained in the room for about one and one-quarter hours until the temperature at the rib line, that is between the first and second ribs, reached about 110° F. The cloth was then removed, the lamb washed and wiped free from any exuding oil or other material. It was thereafter clothed with a brine moistened cloth and allowed to remain in the cooler at approximately 32 F. to 34° F. for twenty-four hours or until completely chilled. The lamb was then ribbed into a hind saddle and a fore saddle. The color of the lamb was a light cherry red and the meat was moist and velvety.

The quarters were separated into cuts which were aged for six weeks and were inspected weekly by cutting into each piece at the end of each week. It was found that the improved color and texture was retained throughout the aging period.

A lamb treated in the conventional way, that is not protected by any covering and transferred to the regular cooler after being washed and chilled for twenty-four hours in the cooler, was ribbed in the same maner as before described. It was noted that the color thereof was a very purplish dark and the texture was dry. Cuts were aged for six weeks and examined weekly in the same manner as the above treated cuts and at all stages they exhibited the same dark color and dry texture characteristics that had been noticed from the beginning.

As another example of the operation of the invention, a calf was killed and dressed on the killing floor without removing the hide and was promptly transferred to the heat treating room where the temperature was maintained at about 118° F. and at a relative humidity of about 100 per cent. The carcass was allowed to remain in the room under these conditions until the center of the longissimus dorsi muscle between the first and second ribs reached about 102.5° F. The elapsed time was one hour. It was then transferred to a cooler maintained at a temperature of approximately 32° F. to 34° F. and allowed to chill for twenty-four hours. The hide was then removed and it was noticed the skinned veal exhibited a very delicate and attractive pink veal color. Upon ribbing the carcass between the first and second ribs into a fore saddle and hind saddle, the same attractive color was maintained throughout the meat. The veal was divided into primal cuts and several of the primal cuts separated into steaks and roasts. It was noticed that the improved color and moist juiciness of the meat was maintained throughout the meat. Several of the cuts were aged for six weeks and examined weekly. It was found that the improved color and texture remained throughout the aging period.

Another calf was killed, dressed by removing the hide on the killing floor and covered with a brine moistened cloth. It was then transferred to the heat treating room where the temperature was maintained at about 118° F. and at approximately one hundred per cent humidity. It was allowed to remain under these conditions until the longissimus dorsi muscle between the first and second ribs reached about 102.5° F., which required a time of about three-quarters of an hour. The cloth was then removed, the surface washed and wiped free of blood spots, stains, etc., and the carcass covered with a brine moistened cloth. The clothed carcass was maintained in a regular cooler at temperatures of about 32° F. to 34° F. for about twenty-four hours. The cloth was then removed and the carcass showed the desirable pink color and moist condition. Upon ribbing the carcass between the first and second ribs into a fore saddle and hind saddle, it was found that the same attractive color was maintained throughout. The hind saddle and fore saddle were then cut up into primal cuts and several of the primal cuts cut into retail cuts. It was noticed that the same delicate pink persisted and the same moist texture continued throughout all the meat. Several of the primal cuts were aged for six weeks and examined weekly by making fresh cuts. It was found that the same texture and characteristics mentioned above remained throughout the aging period.

A calf killed and dressed in the conventional manner and then chilled in the regular cooler was cut up into cuts and it was noted that these cuts did not have the delicate pinkness and desirable moistness of the treated veal. The cuts were aged for six weeks and examined weekly and it was found that the same texture and dryness and color persisted throughout the aging period.

The temperatures herein specified may be attained by means other than those disclosed above, for example by electrical resistance heaters or by the use of heating mediums other than air and steam, such as water, ultra violet light, etc.

The present invention has the advantage of improving the quality and appearance of meat. It produces a product of improved juiciness and flavor. It also improves the color of good quality meat which may often have an undesirable dark color. Moreover, the invention provides a means of treating meats of varying color and texture to produce products of substantially uniform quality in these respects. The products treated in accordance with the present invention may be frozen or frozen and thawed without impairing the beneficial results obtained as a result of such treatment.

Obviously, many modifications and variations of the invention hereinbefore set forth may be made without distinguishing from the spirit and scope thereof, and therefore, only such limitations should be imposed as are indicated in the appended claims.

We claim:

1. A process for treating animal carcasses and cuts thereof, which comprises subjecting the freshly slaughtered carcass to temperatures of about 110° F. to 122° F. and a relative humidity of about 100% until the internal temperature of the meat reaches about 101° F. to 112° F., whereby the color of the meat is substantially improved.

2. A process for treating animal carcasses and cuts thereof to improve the color of the meat, which comprises heat treating the freshly slaughtered carcass at temperatures of about 110° F. to 122° F. and a relative humidity of about 100% for about ¾ to 3½ hours and then promptly chilling the treated product.

3. A process for treating animal carcasses and cuts thereof, which comprises, covering the freshly skinned carcass before dissipation of animal heat with a brine moistened cloth and promptly subjecting the clothed carcass to temperatures of about 110° F. to 122° F. and a relative humidity of about 100% for about 1 to 3½ hours, whereby the color of the meat is substantially improved.

4. A process for treating beef and veal carcasses and cuts thereof to improve the color thereof, which comprises maintaining the freshly slaughtered carcass at temperatures of about 101° F. to 105° F. and a relative humidity of about 100% until the internal temperature of the meat is raised to about 102.5° F. and then promptly chilling the treated product.

5. The method of treating lamb and sheep carcasses and cuts thereof to improve the color, which comprises maintaining the freshly skinned carcass before dissipation of animal heat at temperatures of about 105° F. to 112° F. and a relative humidity of about 100% until the internal temperature of the meat is raised to about 110° F. and then promptly chilling the treated product.

BEVERLY E. WILLIAMS.
LEON L. CADWELL.